Feb. 6, 1951 R. B. HITCHCOCK 2,540,264
ENSILAGE HARVESTER HAVING TWIN ROLLER FEED
Filed Dec. 27, 1943 4 Sheets-Sheet 1

Inventor:
Rex B. Hitchcock,
By Paul O. Pippel
Attorney.

Feb. 6, 1951 R. B. HITCHCOCK 2,540,264
ENSILAGE HARVESTER HAVING TWIN ROLLER FEED
Filed Dec. 27, 1943 4 Sheets-Sheet 2

Inventor:
Rex B. Hitchcock,
By Paul O. Pippel
Attorney.

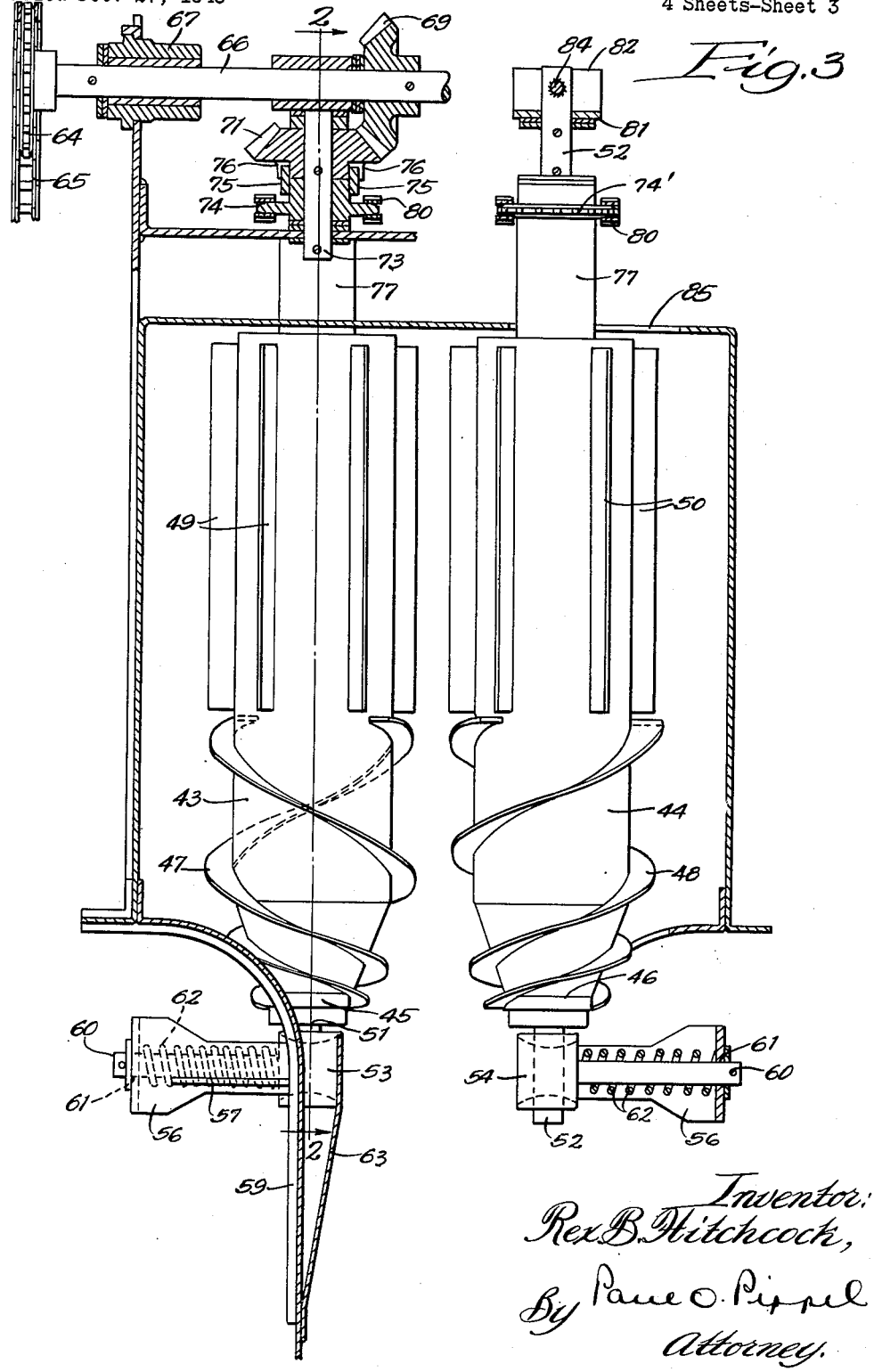

Feb. 6, 1951 R. B. HITCHCOCK 2,540,264
ENSILAGE HARVESTER HAVING TWIN ROLLER FEED
Filed Dec. 27, 1943 4 Sheets-Sheet 4
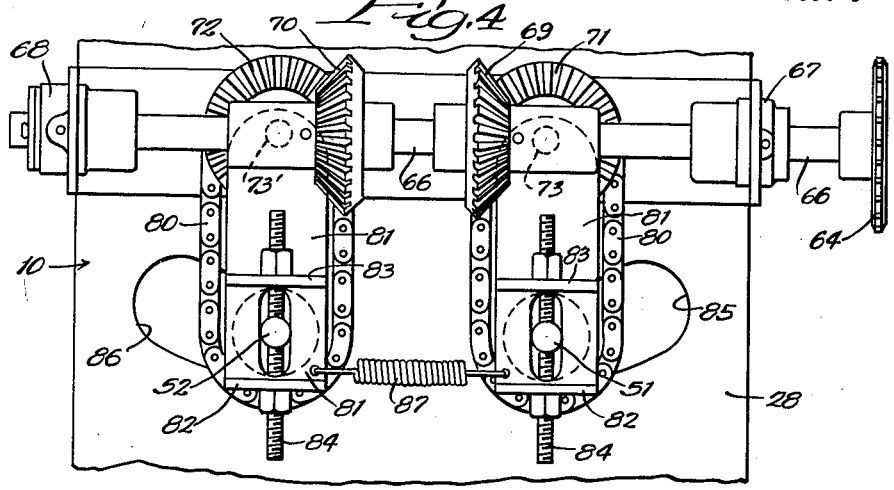
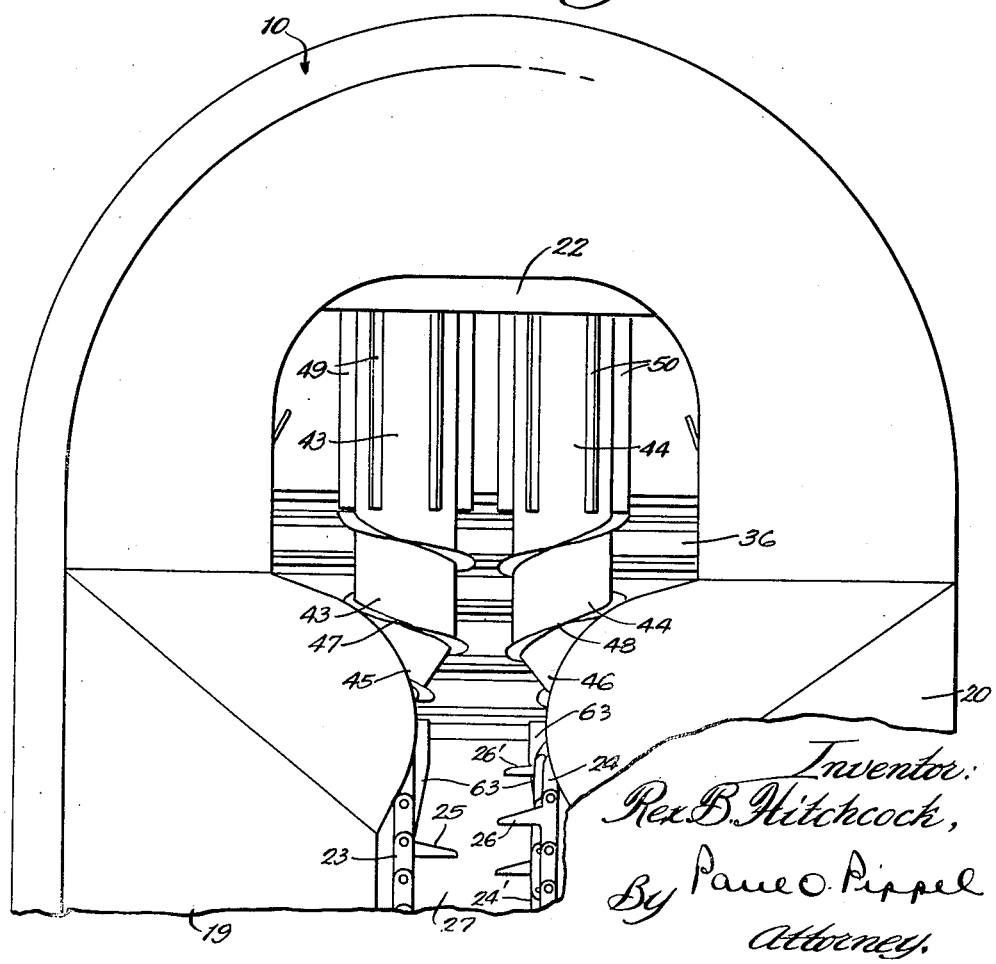
Inventor:
Rex B. Hitchcock,
By Paul O. Pippel
Attorney.

Patented Feb. 6, 1951

2,540,264

UNITED STATES PATENT OFFICE 2,540,264

ENSILAGE HARVESTER HAVING TWIN ROLLER FEED

Rex B. Hitchcock, Evanston, Ill., assignor to International Harvester Company, a corporation of New Jersey Application December 27, 1943, Serial No. 515,677

2 Claims. (Cl. 56—60)

1

This invention relates to a new and improved ensilage harvester and has for one of its principal objects the provision of means for positively feeding cut corn stalks to a chopping mechanism.

An important object of this invention is to provide an ensilage harvester of the type wherein the corn stalks are cut and thereupon carried within the machine to a cutting and chopping device.

Numerous methods have been employed in an ensilage harvester of this type to carry the cut corn stalks and then feed them downwardly through a rotary cutter. The ensilage harvesters are substantially U-shaped, and the corn stalks are carried rearwardly toward the base of the U in a substantially vertical position at which time they are caused to move downwardly into a cutter. The common method for lifting the stalks between the U-arms is a chain and lug conveyor. The base of the U or top of the ensilage harvester is generally equipped with a vertically positioned endless conveyor which is adapted to take the stalks from the chain conveyor and move them downwardly into a cutter. In such a construction there was always a considerable space between the ends of the chain conveyors and the vertical apron-type conveyor. This space between the conveyors, which permitted the corn stalks freedom of control by any conveyor, was the cause of congestion within the throat of the ensilage harvester. It is, therefore, an object of the present invention to maintain control of the cut corn stalks at all times after the stalk is cut until the time it reaches the wagon elevator completely chopped.

Another important object of this invention is to provide a pair of cooperative feed rolls in substantial alignment with and forming a continuation of the regular ensilage harvester conveyor chains.

A further important object of the present invention is the provision of dual function resiliently mounted ensilage harvester rolls.

Other and further important objects of this invention will become apparent from the disclosures in the following specification and accompanying drawings, in which:

Figure 3 is a sectional view taken on the line 3—3 of Figure 2;

Figure 4 is a rear view detail of the roll driving mechanism;

2

Figure 1:
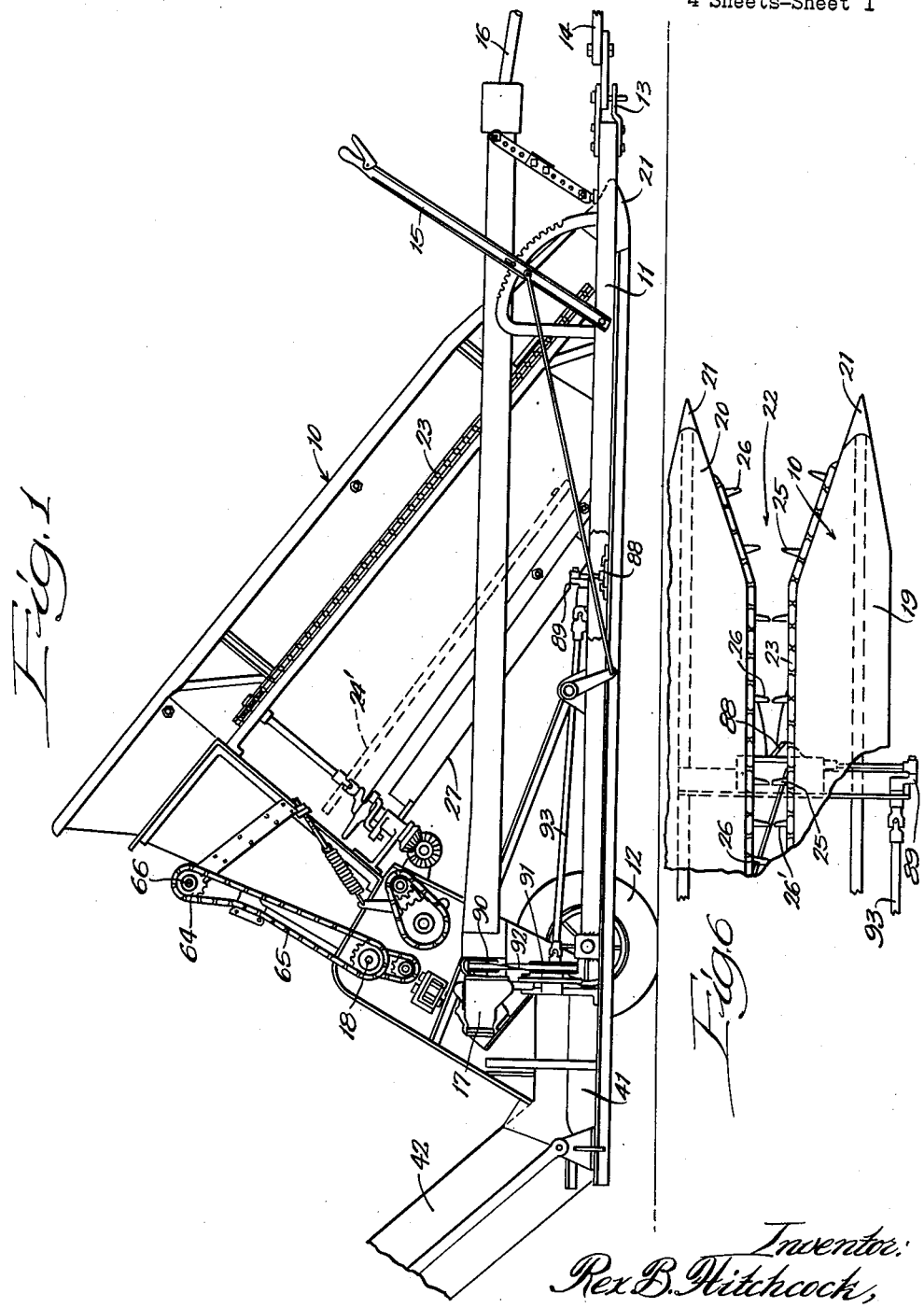
Figure 1 is a side elevation of the ensilage harvester incorporating the novel feed rolls of this invention.

Figure 5 is a top plan view of an upper portion of the ensilage harvester as shown in Figure 1; and Figure 6 is a top plan view of a lower portion of the harvester.

As shown in the drawings, the reference numeral 10 indicates generally a body of an ensilage harvester having a main supporting frame or structure 11 which is mounted on a two-wheeled truck 12 at the rear thereof. The forward end of the frame 11 is equipped with a clevis 13 which is adapted to be hitched to a tractor draw-bar 14. It will be understood that the ensilage harvester shown is a pull type, but the invention is as well adapted for a tractor-mounted ensilage harvester.

The ensilage harvester may be tilted by means of the hand lever 15.

As best shown in Figures 1 and 5, the body portion 10 is in substantially a U-shape with the side portions 19 and 20 terminating in gathering points 21 at the fore-end of the machine and the base of the U or the rear of the machine forming a throat 22. A primary stalk cutter 88, shown in Figures 1 and 6, is provided for reciprocation between the arms 19 and 20 of the U-shaped body 10 and is driven by the crank 89 which derives its power from the V-belt pulley 90 on the power take-off shaft through the pulley 91, belt 92, and drive shaft 93. The stalks are released for subsequent movement by the conveyor chains 23 and 24. The conveyor chains 23 and 24 are equipped with lugs 25 and 26, respectively, which project inwardly toward each other. A third conveyor chain 24' is positioned beneath the chain 24 and has lugs 26'. The corn stalks are more securely held in erect position with this auxiliary chain 24'. A bottom 27 is provided within the body 10 and is inclined at such an angle that it is substantially parallel with the upper surface of the harvester body 10. The cut corn stalks are carried within the ensilage harvester body substantially perpendicular to the base 27 by means of the conveyor chains 23 and 24. The lugs 25, 26, and 26' are positioned at regular intervals around the endless conveyor chains 23, 24, and 24' and adequately maintain sufficient hold on the corn stalks so that they are not permitted to escape or travel in any direction but in an erect position toward the throat 22 of the ensilage harvester body 10.

Figure 2:
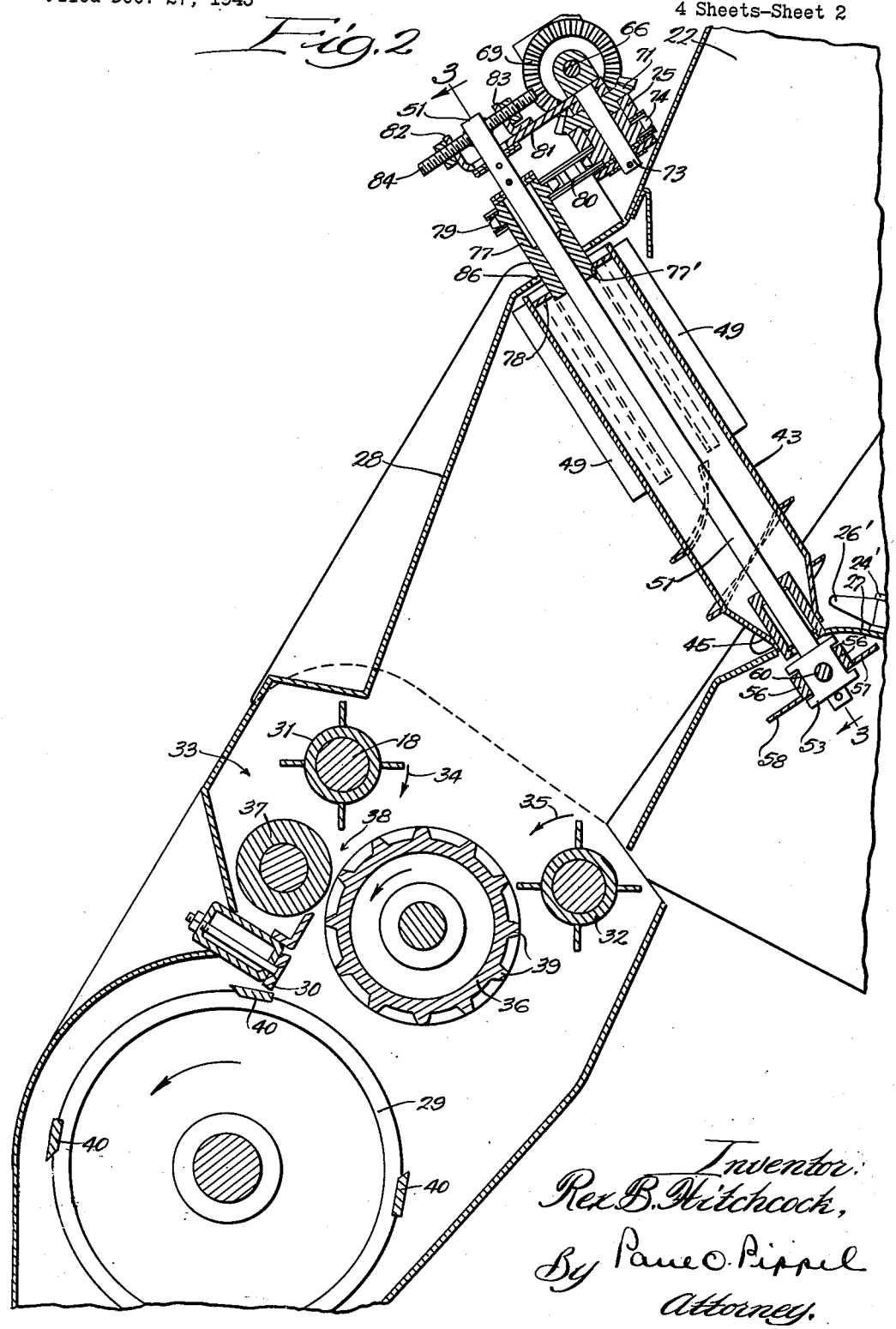
Figure 2 is a vertical sectional view through the throat portion of the ensilage harvester.

As shown in Figure 2, the throat portion 22 of the harvester body 10 occupies a relatively wide space between the end of the chain lug 26' and the rear 28 of the body 10. Beneath this throat 22, a plurality of feed rollers is employed. It is the purpose of the machine to feed vertically disposed corn stalks to the throat 22 and thereupon have the stalks pulled downwardly, butt ends first, into the path of the secondary cutter having a rotary cutter head 29 which cooperates with a stationary plate 30 in chopping the downwardly fed corn stalks. Two similar beaters 31 and 32 are positioned near the top of the feed roll chamber 33 and immediately beneath the throat 22. These beaters 31 and 32 are rotated inwardly toward each other as shown by the arrows 34 and 35. The purpose of these beaters is to prevent corn stalks from getting behind the main feed rolls 36 and 37. If the stalks would get behind the feed roller 36, it is possible that the rotary cutter 29 would become clogged and the machine would be made inoperative. As it is, however, the beaters 31 and 32 constantly cause the downwardly entering corn stalks to be thrown or moved toward the throat or juncture 38, between the feed rolls 36 and 37. The roll 36 is provided with longitudinal ribs 39, whereas the roller 37 has a smooth surface. It is evident, therefore, that the stalks are pulled downwardly by these rolls and caused to enter the path of the rotating blades 40 of the cutter head 29 and thereupon sheared off in small pieces by the stationary plate 30. The small pieces of ensilage are then dropped to a hopper 41 from whence it is fed to a wagon elevator 42.

As stated above, the problem in ensilage harvesters is to obtain a means for continually forcing the corn stalks downwardly into the feed rollers after they leave the lugs 25, 26, and 26' of the conveyor chains 23, 24, and 24', respectively. An endless conveyor apron has been customarily positioned immediately in front of the rear wall 28, but in spite of this the stalks were not firmly held and controlled by any means after they left the chain lugs 25, 26, and 26'. In lieu of this vertically positioned conveyor, a pair of rolls 43 and 44 is provided which will positively maintain the cut corn stalks in firmly held position so that congestion is not permitted in the throat 22 of the machine. As shown in Figure 5, the roll points 45 and 46 are substantially a continuation of the chain conveyors 23, 24, and 24', respectively. The tapered points 45 and 46 of these rolls 43 and 44 are equipped with double spiral flightings 47 and 48. These flightings 47 and 48 are so positioned upon the rolls 43 and 44 rotating toward each other that the stalks will be taken from the lugs 25, 26, and 26' and augered rearwardly to the point between the rolls 43 and 44 where the spiral flighting ends and the longitudinal ribs or flutes 49 and 50 begin. At this point the stalks no longer travel rearwardly but are projected downwardly into the feed roll chamber 33.

Often times a plurality of stalks are projected between these roller points 45 and 46 at one time, and it is, therefore, desirable to have them resiliently mounted as shown in Figures 3 and 4. The rolls 43 and 44 are equipped with forwardly projecting central shafts 51 and 52 which are journaled within bearings 53 and 54. As best shown in Figures 2 and 3, these bearings 53 and 54 are retained within bail-like straps 56. The straps 56 are held affixed to the body 10 of the ensilage harvester by means of plates 57 and 58 welded to the top and bottom of the brackets 56 and thence welded or otherwise attached to the side sheets 59 of the side arms 19 and 20 of the U-shaped body 10. Studs 60 are affixed to the bearings 53 and 54 and are slidably journaled within the outer ends of the bail-like brackets 56 at 61. Springs 62 surround the studs 60 within the bail member 56 and resiliently and yieldably maintain the points 45 and 46 in their closest relative position at the center of the machine. Guide sheets 63 are welded or otherwise fastened to the side sheets 59 and are inclined rearwardly to the point where they overlap the bearings 53 and 54. These guide sheets, therefore, eliminate the possibility of corn stalks being caught within the spring held mechanism of the rollers 43 and 44. These rolls 43 and 44 will therefore accommodate any size or quantity of stalks that may be taken into the machine at any one time and will yield to prevent breakage.

The rolls 43 and 44 are rotated toward each other and secure their drive from the sprocket 64 which is directly connected to the sprocket 18 by means of a chain 65. The rear view in Figure 4 shows that the sprocket 64 keyed or otherwise fastened to the shaft 66 will impart rotation to this shaft 66 which is journaled within bearings 67 and 68. Bevel gears 69 and 70 are also keyed to this transverse shaft 66 and engage the complementary bevel gears 71 and 72, respectively. As shown in Figure 2, the bevel gear 71 is journaled on the short shaft 73 on which is mounted a sprocket 74 substantially beneath the bevel gear 71. Both the bevel gear and sprocket 71 and 74 are keyed to each other and are merely journaled on the shaft 73. The interlocking or keying mechanism is best shown in Figure 3, wherein the sprocket 74 is equipped with a plurality of upwardly extending fingers 75 which engage notches or recesses 76 in the bevel gear 71. A similar shaft 73' and sprocket 74' are associated with the bevel gear 72.

The rolls 43 and 44 have their shafts 51 and 52 projecting rearwardly beyond the rear wall 28 of the ensilage harvester body. The central shafts 51 and 52 do not rotate. Sleeves 77 are adapted to surround these non-rotatable shafts 51 and 52 and project within the ends 78 of the rolls 43 and 44. A key or flat surface is provided at 77' to provide rotation of the rolls 43 and 44. A sprocket 79 is keyed or otherwise fastened to the sleeve 77 in alinement with the sprocket 74 so that a chain 80 surrounding these sprockets 74 and 79 will carry the drive from the sprocket 64 to the rolls 43 and 44.

The tension in the chains 80 is maintained by bracket 81 pivotally depending from the shafts 73 and 73'. This bracket 81 is further equipped with flanges 82 and 83 which threadedly support a shaft 84 having oppositely threaded ends. The central portion of the shaft 84 is attached to the shaft 51, whereupon rotation of threaded shaft 84 will cause either up or down shifting movement of this roll supporting shaft 51 to achieve proper tensioning of the drive chain 80.

As shown in Figure 4, the end wall 28 of the ensilage harvester body 10 is equipped with two arcuate slots 85 and 86 through which the roll shafts 51 and 52 project. The arcuate slots 85 and 86 are sufficiently large to enable the sleeve 77 to move therein. A spring 87 is adapted to connect the brackets 81. It is quite obvious now that in addition to having the forward ends or points of the rolls resiliently yieldable, the rear ends of the rolls 43 and 44 are also yieldable outwardly through the arcuate range defined by the slots 85 and 86, which are arcs drawn about the centers 73 and 73'. The spring 87 normally holds these brackets 81 together, but it is obvious that an excessive amount of corn stalks between the rolls 43 and 44 will cause the rolls to separate, and the roll shafts 51 and 52 will hinge about the shafts 73 and 73', which support the sprockets 74 and 74'. It is obvious that the movement of the shafts 51 and 52 through the arcuate slots 85 and 86 will not affect the drive of the rolls 43 and 44 for the reason that the chains 80 remain in a constant length inasmuch as they swing through an arc about the shafts which support the upper sprockets 74 and 74'. Either roll 43 or 44 may have its rear end moved outwardly separately from the other, or both may be moved outwardly simultaneously depending only on the load of stalks carried between the rolls 43 and 44.

It is believed that herein is provided a novel, simple, and efficient means of positively feeding corn stalks, butt ends first, in the throat of an ensilage harvester downwardly to the cutting mechanism. This means, taking the form of the rolls 43 and 44 which have augering portions as well as downwardly feeding flutes or ribs, is quite positive in its action and does away with congestion in the throats of ensilage harvester machines. The fact that these rolls form continuation of the regular feeding chains eliminates the possibility of the corn stalks from getting out of control of the machine and thereupon performs its function of firmly gripping the corn stalks after they leave the conveyor chains and forces them down to the chopping mechanism.

The intention is to limit the patent only within the scope of the appended claims.

What is claimed is:

1. In an ensilage harvester having a supporting structure, a primary cutter and a secondary cutter arranged rearwardly thereof and both mounted on said supporting structure, conveying means on said supporting structure for delivering stalks rearwardly from the primary cutter, and including a pair of cooperative rolls journalled longitudinally in said supporting structure in substantial alignment with said rearward conveying means, each of said rolls rotatably driven from the rear thereof, a sprocket on the end of each roll, an individual drive chain for each sprocket, and a spring extending between the ends of said rolls, whereby said rolls are yieldable outwardly away from each other in arcuate paths about the chain ends.

2. In an ensilage harvester, a supporting structure, a primary cutter mounted on said supporting structure for severing standing stalks, upper and lower gathering chains on said supporting structure for moving said stalks rearwardly in erect position, an upright feed throat forming part of said supporting structure to receive said stalks, stalk chopper means at the lower end of said throat and journally mounted to receive said stalks butt ends first, a pair of feed rolls positioned across the throat between the gathering chains and the stalk chopper means, said feed rolls being upwardly and rearwardly inclined with respect to the lower of said gathering chains, and means for driving the rolls, said rolls having stalk moving conformations thereon and lower conically reduced ends positioned closely adjacent the discharge end of the lower of said gathering chains, whereby a positive stalk controlling feed is provided from the primary cutter to the stalk chopper.

REX B. HITCHCOCK.

REFERENCES CITED

The following references are of record in the file of this patent:

UNITED STATES PATENTS

| Number | Name | Date |
|---|---|---|
| 196,400 | Terman | Oct. 23, 1877 |
| 725,759 | McDole et al. | Apr. 21, 1903 |
| 1,159,935 | Hance | Nov. 9, 1915 |
| 1,528,635 | Ronning et al. | Mar. 3, 1925 |
| 1,641,436 | Jett | Sept. 6, 1927 |
| 1,683,042 | Krogan | Sept. 4, 1928 |
| 1,699,251 | Ronning et al. | Jan. 15, 1929 |
| 2,139,868 | Thieman | Dec. 13, 1938 |
| 2,223,704 | Powell | Dec. 3, 1940 |
| 2,333,901 | Swenson | Nov. 9, 1943 |
| 2,349,328 | Aasland | May 23, 1944 |